United States Patent [19]

Zagler et al.

[11] Patent Number: 4,571,190
[45] Date of Patent: Feb. 18, 1986

[54] DEVICE FOR FORMING BRAILLE TACTILE DISPLAY

[75] Inventors: Wolfgang Zagler; Wolfgang Oberleitner, both of Vienna, Austria

[73] Assignee: Siemens Aktiengesellschaft, Munich, Fed. Rep. of Germany

[21] Appl. No.: 717,728

[22] Filed: Mar. 29, 1985

[30] Foreign Application Priority Data

Mar. 30, 1984 [AT] Austria ................................. 1093/84

[51] Int. Cl.⁴ .............................................. G09B 21/02
[52] U.S. Cl. .................................... 434/114; 400/122; 101/23
[58] Field of Search ................. 434/114, 113; 400/122

[56] References Cited

U.S. PATENT DOCUMENTS 3,132,962  5/1964  Seymour .............................. 434/113
3,736,672  6/1973  Skewis et al. ....................... 434/114
3,987,438 10/1976  Lindenmüeller et al. ...... 434/114 X
4,500,293  2/1985  Eltgen ................................ 434/114

OTHER PUBLICATIONS

IBM Technical Disclosure Bulletin, vol. 18, No. 7, Dec. 1975.
Xerox Disclosure Journal, vol. 1, No. 5, May 1976.

Primary Examiner—William H. Grieb
Attorney, Agent, or Firm—Kenyon & Kenyon

[57] ABSTRACT

A device for forming a tactilely readable display including Braille characters includes a planar display carrier wherein consisting essentially of a belt of flexible material which forms a closed loop and revolves about two rotating rolls. Circular openings are provided on an outer side of the belt loop, the inner side of the belt being provided with a multiplicity of recesses communicating with respective openings in the outer side of the belt. A steel ball may be lodged in each of the recesses, a portion of each ball protruding through the associated opening to form a spherical raster dot on the outer side of the belt. An upper portion of the belt passes over a contact plate, which forms a reading zone of the Braille display device, while a lower portion of the loop passes through a steel ball container in which all of the recesses become occupied by a respective ball. At a ball selection at an upstream end of the contact plate, as defined by the motion of the belt, an electromagnetically actuated selection device is disposed above the upper end of a guide channel extending downwardly from the selection station to the ball container. The selection device selectively retains steel balls in the recesses of the belt during the passage thereof over the guide channel at the selection station. Unretained steel balls fall back into the container via the guide channel.

10 Claims, 2 Drawing Figures

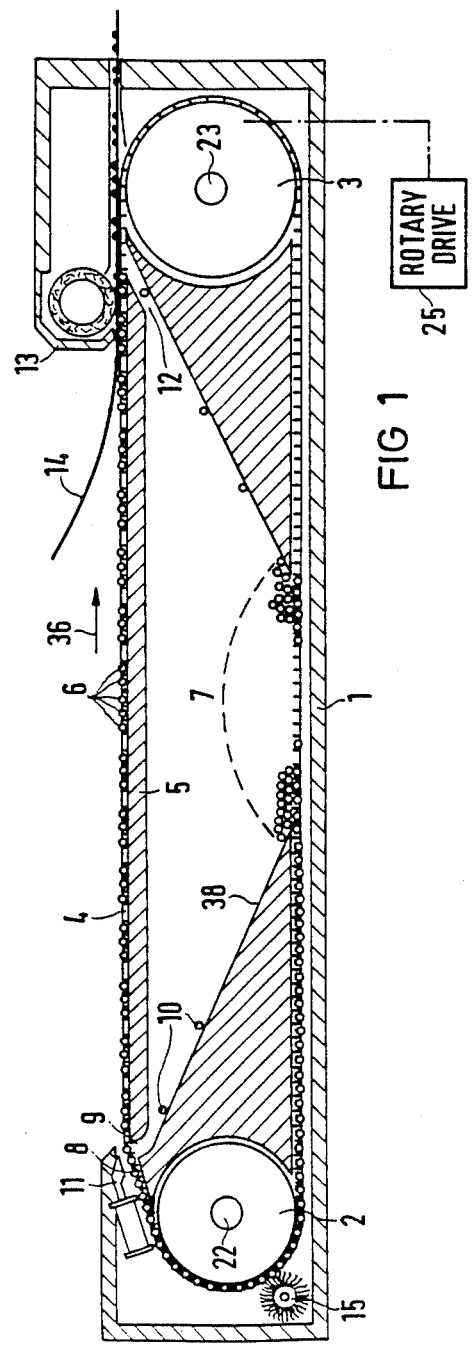
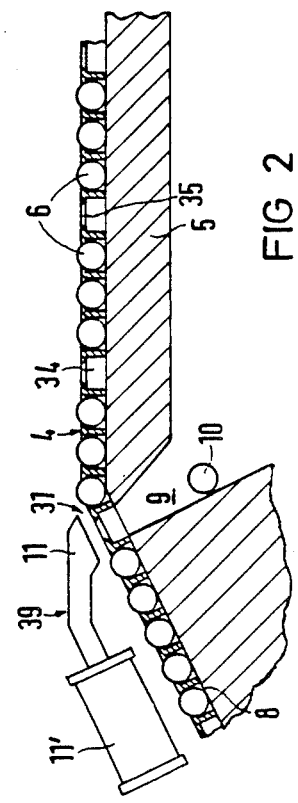

DEVICE FOR FORMING BRAILLE TACTILE DISPLAY

BACKGROUND OF THE INVENTION

This invention relates to a device for forming a tactilely readable display including Braille characters. The device has a display carrier with raised raster dots which are formed by spherical segments selectively protruding through openings in the surface of the display carrier.

Known electromagnetically operable devices for forming Braille messages are provided witn indicator boards each comprising a hole raster with the basic configuration of the Braille characters. In these holes are located pins which can be individually shifted in an upward direction by means of electromagnets, the shifting of tne pins being coordinated so that the totality of outwardly protruding pins forms Braille characters. In one of the known devices, the outwardly protruding ends of the pins have the shapes of spherical segments.

All known Braille reading devices of the above-described type present a text which is limited by the size of the display panel. If the text to be displayed in tactile form is longer than the display panel, the text must be subdivided and stored in sections corresponding to the size of the display panel. The stored sections of text are converted into electrical signals for controlling the energization of electromagnetic actuators.

An object of the present invention is to provide an improved Braille reading device of the type generally described above.

Another, more particular, object of the present invention is to provide such a Braille reading device which enables uninterrupted use.

SUMMARY OF THE INVENTION

A device for forming a tactilely readable message including Braille characters comprises, in accordance with the present invention, a belt of flexible material forming a closed loop having an inner side and an outer side facing oppositely thereto, the belt being provided on the outer side with a multiplicity of openings and on the inner side with a multiplicity of recesses for receiving respective steel balls. The recesses each communicate with a respective one of the openings. The openings in the belt are smaller than the diameters of the steel balls so that the steel balls lodged in the recesses of the belt protrude partially through the associated openings in the outer side of the closed loop to form thereon an array of spherical segments serving as raised raster dots in a tactilely readable display.

The Braille reading device further comprises a frame and a pair of rolls supported thereby for rotation about respective parallel axes spaced from one another. The belt is partially wound about each of the rolls.

A contact plate is provided for holding a multiplicity of the steel balls in selected recesses of the belt in a reading zone laterally spaced from a plane defined by the axes of rotation of the rolls. The contact plate is connected to the frame and has an outer surface engageable with the belt on an inner side of an upper portion of the closed loop to form the reading zone of the belt. A selector mechanism is disposed at a ball selection station at one end of the contact plate for retaining selected steel balls in respective recesses in the belt and for removing unselected steel balls from their respective recesses to form a tactilely readable display in the upper loop portion. A receptacle connected to the frame contains a supply of the steel balls, a lower portion of the closed belt loop being disposed in the receptacle, whereby each of the recesses on the inner side of the lower loop portion is occupied with a respective steel ball from the supply in the receptacle.

In accordance with specific features of the present invention, a guide channel extends to the receptacle from the ball selection station for guiding unretained or removed steel balls from the belt to the receptacle. The selector is disposed above the guide channel at the selection station for retaining selected steel balls in the belt recesses in opposition to the force of gravity. The ball selector preferably takes the form of an electromagnetically actuatable component arranged perpendicularly to the direction of motion of the belt at the selection station.

In accordance with another, particular, feature of the present invention, the Braille reading device may include an additional roll of elastic material disposed at an end of the contact plate opposite the selection station and resiliently pressed against the belt, whereby the tactilely readable display formed in the upper portion of the closed loop can be embossed in webs of deformable material such as paper.

BRIEF DESCRIPTION OF THE DRAWING

FIG. 1 is a longitudinal cross-sectional view of a device in accordance with the present invention for forming a tactilely readable display including Braille characters.

FIG. 2 is a detailed view of a portion of the device illustrated in FIG. 1.

DETAILED DESCRIPTION

A device for forming a tactilely readable display including Braille characters (i.e., a Braille reading device) comprises a tray-shaped housing or frame 1 in which two rolls 2 and 3 are supported for rotation about respective horizontal axes 22 and 23. Partially wound about rolls 2 and 3 is a belt 4 of flexible material which serves as a display carrier and is joined to form an endless loop. An upper portion of the belt loop slidably engages an outer surface 24 of a contact plate 5 disposed between rolls 22 and 23 in a laterally spaced relationship with respect to a plane defined by rotation axes 22 and 23.

At least one of the rolls 22 and 23 is operatively connected to a rotary drive 25 which functions to rotate the rolls and cause the upper portion of belt 4 to move along contact plate 5. Outer surface 24 of contact plate 5 is advantageously convex for increasing the tension on belt 4 and for improving the pressure exerted thereon by surface 24 during the motion of belt 4. The curvature of outer surface 24 of the contact plate is preferably small so that contact plate 5 causes the upper portion of belt 4 to assume a substantially planar configuration in the reading zone of the device.

The upper portion of belt 4 can be tactilely sensed by a reader, the lines of characters running transversely to the direction of motion of belt 4.

As illustrated in detail in FIG. 2, belt 4 is made of an elastic plastic provided on an outer side with a multiplicity of circular openings 35 and on an inner side with a multiplicity of recesses 34 arranged in the raster of the Braille characters distributed over the entire surface of belt 4. Each recess 34 is of a size to receive a single steel ball 6 having a diameter of about 2 mm. and communicates with a respective opening 35. The openings are smaller in diameter than the steel balls, so that when a steel ball is lodged in a recess 34, the ball protrudes partially through the associated opening 35 in the outer side of the belt. The protruding portion of a steel ball is recognizable by a reader as a raster dot, the totality of protruding ball portions in the outer side of the belt loop forming a tactilely readable display.

Belt 4 can be coated on its outer side with a metal foil for enhancing the durability of the belt, the foil being provided with a multiplicity of apertures which are aligned with the openings in the outer side of the plastic belt.

Upon the rotation of roll 23 by drive 25, the upper portion of belt 4 is advanced over contact plate 5 in the direction indicated by an arrow 36. The lower portion of belt 4 moves through a receptacle or chamber 7 which contains a supply of steel balls 6. During motion of the lower portion of belt 4 through receptacle 7, all of the recesses 34 on the inner side of belt 4 become occupied by respective steel balls 6.

Wiper edges or guiding strips (not illustrated) may be provided at the bottom of receptacle 7 for insuring that each recess 34 is occupied by a respective ball. It is to be noted that the recesses on the inner side of the belt loop have a sufficiently large diameter so that steel balls 6 in receptacle 7 easily fall into the recesses in the lower portion of the belt loop. The belt filled with steel holes 6 is transported upwardly by roll 2 and, upon the disengagement of belt 4 from roll 2, slides along a contact surface 8 which serves to prevent the steel balls from falling out of recesses 34, which are now open in a downward direction.

Between contact surface 8 and contact plate 5 is disposed a separation well or guide channel 9 extending transversely to the direction of motion of belt 4 from a ball selection station 37 to receptacle or chamber 7. Steel balls 10 not required for the formation of a tactilely readable display in the upper portion of belt 4 are removed from the belt recesses 34 at the ball selection station 37 under the force of gravity and roll downwardly along guide channel 9 and a guide surface 38 to a ball supply at the bottom of receptacle 7.

For selecting the steel balls 6 which are required for forming a tactilely readable display or message including Braille characters, an electromagnetic selection device 39 is provided at selection station 37. Selection device 39 preferably includes a plurality of magnetic cores 11 at least partially arranged transversely to the direction of motion of belt 4 at selection station 37, each electromagnetic core being associated with a row of steel balls 6. Selection device 39 further includes a plurality of electromagnetic excitation coils 11' equal in number to the actuator cores, each coil partially surrounding a respective core.

At an upper end, guide channel or separation well 9 has a diameter greater than, but approximately equal to, the diameter of steel balls 6, so that all the steel balls lodged in recesses 34 would fall into guide channel 9 when belt 4 slides thereover, in the absence of additional measures. Steel balls 6 required for a desired tactile display in an upper portion of belt 4 are retained in respective recesses 34, during the passage of those recesses over the guide channel, by the selective electromagnetic energization of the electromagnetic core components 11 associated with respective rows of recesses 34 in belt 4. Upon the passage of a ball 6 over the upper end of guide channel 9, the ball is retained in its respective recess 34 by the upper surface 24 of contact plate 5.

Instead of a single guide channel 9, several individual separation wells may be provided in a linear array extending transversely to belt 4, i.e., a separate guide channel may be provided for each row of recesses 34 in belt 4. The Braille reading device is provided with sensors (not illustrated) for detecting the position of belt 4, the sensors being operatively connected to an electronic control device such as a microprocessor (not illustrated) for controlling the energization of excitation coils 11' to form a desired Braille message.

At an end of contact plate 5 opposite selection station 37, a further guide channel 12 may be provided for emptying all recesses 34 of remaining steel balls 6. The steel balls roll from channel 12 to the supply at the bottom of receptacle 7. Belt 4 is thereafter deflected downwardly by drive roll 3 and subsequently transported completely empty into receptacle 7 where the recesses 34 are again occupied by respective steel balls 6.

For copying the tactile display from the upper portion of belt 4 onto a substantially permanent medium, an additional roll 13 made of elastic material may be provided at the end of the reading zone above contact plate 5 and upstream of channel 12, as defined by tne direction of motion (arrow 36) of the upper portion of the belt loop. Roll 13 is resiliently pressed against belt 4 and a sheet of paper 14 or a web of another deformable material is inserted between belt 4 and roll 13, whereby the Braille characters in the tactile display may be embossed on the sheet or web.

Dirt on belt 4 and steel balls 6 can be removed by a built-in cleaning device 15, advantageously in the form of a fixed or a rotating brush. In addition, cleaning agents may be applied to the brush for facilitating the cleaning of the belt.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proferred to facilitate comprehension of the invention and should not be construed to limit the scope thereof.

What is claimed is:

1. A device for forming a tactilely readable display including Braille characters, comprising:

a belt of flexible material forming a closed loop having an inner side and an outer side facing oppositely thereto, said belt being provided on said outer side with a multiplicity of openings and on said inner side with a multiplicity of recesses for receiving respective steel balls, said recesses each communicating with a respective one of said openings and said openings being smaller than the diameters of said steel balls so that steel balls lodged in said recesses protrude partially through the associated openings in the outer side of said closed loop to form on said outer side an array of spherical segments serving as raised raster dots in a tactilely readable display;

a pair of rolls, said belt being partially wound about each of said rolls;

frame means for supporting said rolls for rotation about respective parallel axes spaced from one another;

contact means for holding a mulitplicity of said steel balls in selected ones of said recesses in a reading zone laterally spaced from a plane defined by said axes, said contact means including a contact plate connected to said frame means and having an outer surface engageable with said belt on said inner side of an upper portion of said closed loop to thereby form said reading zone;

drive means operatively coupled to at least one of said rolls for rotating same and thereby causing said upper portion of said closed loop to move along said contact plate;

receptacle means connected to said frame means for containing a supply of said steel balls, a lower portion of said closed loop being disposed in said receptacle means, whereby each of the recesses on said inner side of the lower portion of said closed loop is filled with a respective steel ball from the supply in said receptacle means, said drive means causing said lower portion of said closed loop to move through said receptacle means upon rotation of said one of said rolls; and selection means for retaining selected steel balls in respective recesses in said belt and for removing unselected steel balls from their respective recesses to form a tactilely readable display in said upper portion of said closed loop, said selection means being connected to said frame means and disposed at a ball selection station at an upstream end of said contact plate, as defined by the direction of motion of said belt along said contact plate upon rotation of said one of said rolls by said drive means.

2. The device defined in claim 1 further comprising guide means including a channel extending to said receptacle means from said ball selection station for guiding removed steel balls from said selection station to said receptacle means.

3. The device defined in claim 2 wherein said selection means includes a component at said selection station for exerting a force to retain selected steel balls in respective recesses in said belt in opposition to the force of gravity.

4. The device defined in claim 3 wherein said component is arranged perpendicularly to the direction of motion of said belt at said selection station.

5. The device defined in claim 4 wherein said selection means includes an electromagnetic member for actuating said component to exert said force.

6. The device defined in claim 3 wherein said selection means includes an electromagnetic member for actuating said component to exert said force.

7. The device defined in claim 1, further comprising an additional roll of elastic material disposed at an end of said contact plate opposite said selection station and resiliently pressed against said belt, whereby the tactilely readable display formed in the upper portion of said closed loop can be embossed onto webs of deformable material.

8. The device defined in claim 7, further comprising additional guide means extending to said receptacle means from a point downstream of said additional roll, as defined by the direction of motion of said upper portion of said closed loop, for returning all steel balls from said belt to said receptacle means.

9. A device for forming a tactilely readable display including Braille characters, comprising:

a belt of flexible material forming a closed loop having an inner side and an outer side facing oppositely thereto, said belt being provided on said outer side with a multiplicity of openings and on said inner side with a multiplicity of recesses for receiving respective steel balls, said recesses each communicating with a respective one of said openings and said openings being smaller than the diameters of said steel balls so that steel balls lodged in said recesses protrude partially through the associated openings in the outer side of said closed loop to form on said outer side an array of spherical segments serving as raised raster dots in a Braille tactile display;

a pair of rolls, said belt being partially wound about each of said rolls;

frame means for supporting said rolls for rotation about respective parallel axes spaced from one another;

contact means for holding a multiplicity of said steel balls in selected ones of said recesses in a substantially planar reading zone, said contact means including a contact plate connected to said frame means and having a substantially planar outer surface engageable with said belt on said inner side of an upper portion of said closed loop to form said substantially planar reading zone;

receptacle means connected to said frame means for containing a supply of said steel balls, a lower portion of said closed loop being disposed in said receptacle means, whereby each of the recesses on said inner side of the lower portion of said closed loop is filled with a respective steel ball from the supply in said receptacle means;

guide means including a channel extending to said receptacle means from a ball selection station at an end of said contact plate for guiding to said receptacle means unretained steel balls falling under the force of gravity from respective recesses in said belt at said selection station; and selection means connected to said frame means and disposed at said selection station above said channel for retaining selected steel balls in respective recesses in said belt in opposition to the force of gravity to form a tactilely readable display in said upper portion of said closed loop, said selection means including an electromagnetically actuated selection component arranged perpendicularly to the direction of motion of said belt at said selection station.

10. The device defined in claim 9 further comprising an additional roll of elastic material disposed at an end of said contact plate opposite said selection station and resiliently pressed against said belt, whereby the tactilely readable display formed in the upper portion of said closed loop can be embossed onto webs of deformable material.

* * * * *